Patented Sept. 24, 1935

2,015,161

UNITED STATES PATENT OFFICE 2,015,161

AZODYESTUFF

Hugo Schweitzer, Leverkusen-Wiesdorf, and Gerhard Schrader, Opladen, Germany, assignors to General Aniline Works, Inc., New York, N. Y., a corporation of Delaware No Drawing. Application August 12, 1933, Serial No. 684,924. In Germany September 9, 1932

5 Claims. (Cl. 260—86)

The present invention relates to new azodyestuffs, more particularly it relates to azodyestuffs which may be represented by the probable general formula:

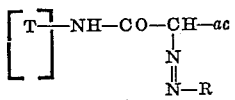

wherein T stands for a radical of a thiazole compound which is attached to the imino group by a carbon-linkage, such as for a thiazole nucleus which may bear monovalent substituents or for a thiazole nucleus to which an arylene radical is condensed, for instance, T may stand for the radical of a thiazole which is derived from an aminobenzene, aminonaphthalene, aminocarbazole, aminodiphenyleneoxide, aminodiphenylenesulfide, aminoacenaphthene, aminofluorenone, aminofluorene, aminocoumarane, which amino compounds may bear further substituents; as substituents that may be present in the radical T there may be mentioned by way of example, alkyl, alkoxy, halogen, the nitro group, the amino group and a substituted amino group, the sulfonic acid group, the carboxylic acid group, $ac$ stands for an acyl radical, such as an acyl of the aliphatic or aromatic series, for instance, acetyl, propionyl, butyryl, benzoyl, chlorobenzoyl, methylbenzoyl, nitrobenzoyl and the like, and R stands for the radical of a diazotized aminothiazole-sulfonic acid compound, such as a mono- or di-sulfonic acid of dehydrothiotoluidine, dehydrothioxylidine, primuline and the like.

Our new dyestuffs are obtainable by diazotizing in the usual manner with hydrochloric acid and sodium nitrite a sulfonic acid of an aminothiazole compound and coupling with a thiazole compound of the general formula:

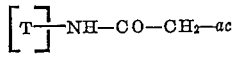

wherein T and $ac$ mean the same as stated above.

In form of their alkali metal salts our new dyestuffs are generally yellow to brown substances, which are soluble in water and dyeing cellulosic fibres generally yellow shades of good fastness to light which are unaffected by brightening and which can be discharged to a pure white.

The invention is illustrated by the following examples, without being limited thereto:

Example 1.—44.4 parts by weight of the sodium salt of dehydrothiotoluidinedisulfonic acid are diazotized in the usual manner with 6.9 parts by weight of sodium nitrite in the presence of 35 parts by weight of crude hydrochloric acid. The diazo solution is then introduced into an aqueous suspension prepared from 26.4 parts by weight of 2-acetoacetylamino-5-methoxybenzothiazole to which suspension 20 parts by weight of crystallized sodium acetate have been added. When the coupling is complete, the dyestuff having in its free state the following formula:

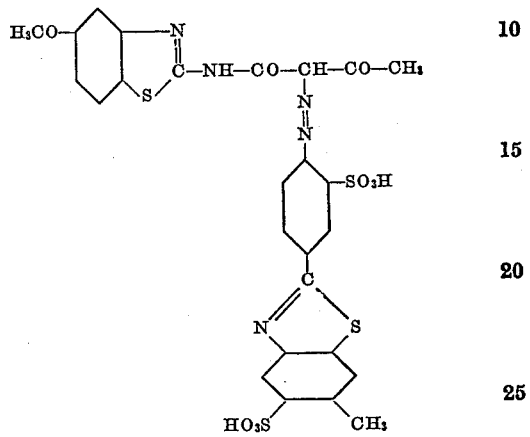

is filtered and dried. It dyes cotton greenish-yellow shades of good fastness to light which are unaffected by brightening and which can be discharged to a pure white.

By substituting the dehydrothiotoluidinedisulfonic acid by an equivalent quantity of the dehydrothiotoluidinemonosulfonic acid of the formula:

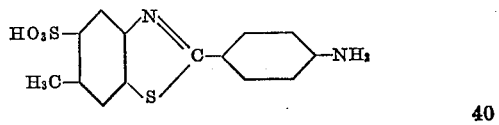

there is obtained a dyestuff rather difficulty soluble in water, yielding similar shades.

By substituting the 2-acetoacetylamino-5-methoxybenzothiazole by equivalent quantities of 2-acetoacetylamino-4-methylbenzothiazole, the 2-acetoacetylaminobenzothiazole, the 2-acetoacetylamino-6-ethoxybenzothiazole, the 2-acetoacetylamino-4-methoxybenzothiazole, the 2-acetoacetylamino-6-methylbenzothiazole, the 2-acetoacetylamino-6-chlorobenzothiazole, 2-acetoacetylamino-(2′,1′-naphtho)-thiazole, there are obtained dyestuffs of similar properties.

By substituting the 2-acetoacetylaminothiazole compounds by the corresponding 2-benzoylacetyl-aminothiazole compounds there are obtained dyestuffs which are more difficultly soluble in water, but have otherwise similar properties.

*Example 2.*—44.4 parts by weight of the sodium salt of dehydrothio-xylidinedisulfonic acid are diazotized as described in Example 1. The diazo solution is introduced into an aqueous suspension of 26.4 parts by weight of 2-acetoacetylamino-5-methoxybenzothiazole to which 20 parts by weight of crystallized sodium acetate are added. When the coupling is complete, the dyestuff is isolated and dried. It dyes cotton yellow shades of good fastness to light, which are unaffected by brightening and which can be discharged to a pure white. The dyestuff corresponds to the following formula:

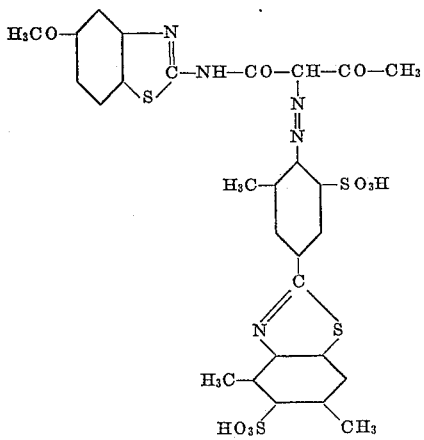

*Example 3.*—44.4 parts by weight of the sodium salt of dehydrothiotoluidinedisulfonic acid are diazotized as described in Example 1. The diazo solution is introduced into an aqueous suspension of 19.8 parts by weight of 2-acetoacetyl-amino-4-methylthiazole to which suspension 20 parts by weight of crystallized sodium acetate have been added. When the coupling is complete, the dyestuff having in the free state the following formula:

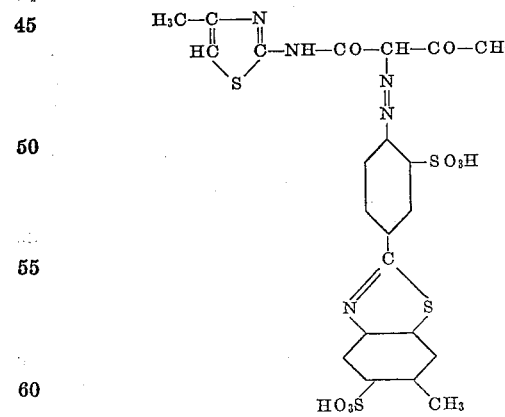

is filtered and dried. It dyes cotton greenish-yellow shades of good fastness properties which can be discharged to a pure white.

By substituting the 2-acetoacetylamino-4-methylthiazole by a corresponding quantity of 2-acetoacetylamino-4.5-dimethylthiazole, 2 - acetoacetylamino-4-phenylthiazole, 2 - acetoacetylamino-4.5-diphenylthiazole, 2 - benzoylacetylamino-4-methyl-thiazole, there are obtained dyestuffs of similar properties.

By substituting the dehydrothiotoluidinedisulfonic acid by a corresponding quantity of dehydrothiotoluidinemonosulfonic acid or dehydrothioxylidinemono- or -disulfonic acid, or primuline sulfonic acids, there are obtained dyestuffs dyeing similar shades.

*Example 4.*—44.4 parts by weight of the sodium salt of dehydrothiotoluidinedisulfonic acid are diazotized and coupled as described in Example 1 with 24.8 parts by weight of 6-acetoacetylamino-2-methylbenzothiazole. The dyestuff having in its free state the following formula:

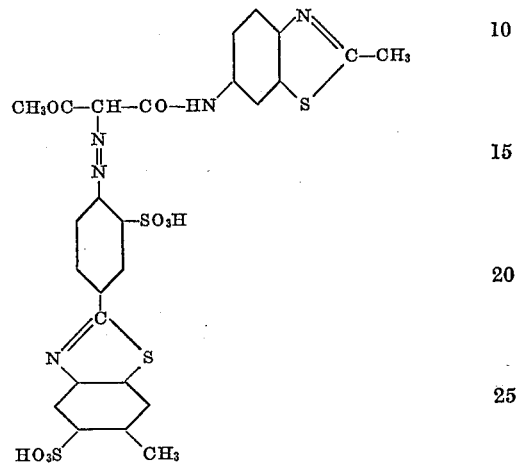

dyes cotton yellow shades of good fastness properties which can be discharged to a pure white.

We claim:

1. Azodyestuffs of the general formula:

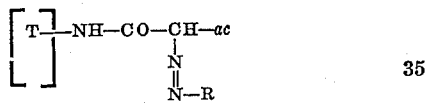

wherein T stands for the radical of a thiazole compound which is attached to the imino group by a carbon-linkage, *ac* stands for an acyl radical and R stands for the radical of a diazotized aminothiazole sulfonic acid compound, being in form of their alkali metal salts generally yellow to brown substances which are soluble in water and dyeing cellulosic fibres generally yellow shades of good fastness to light which are unaffected by brightening and which can be discharged to a pure white.

2. Azodyestuffs of the general formula:

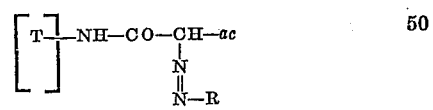

wherein T stands for the radical of a benzothiazole compound which is attached to the imino group by a carbon-linkage, *ac* stands for an acyl radical and R stands for the radical of a diazotized aminothiazole sulfonic acid compound, being in form of their alkali metal salts generally yellow to brown substances which are soluble in water and dyeing cellulosic fibres generally yellow shades of good fastness to light which are unaffected by brightening and which can be discharged to a pure white.

3. Azodyestuffs of the general formula:

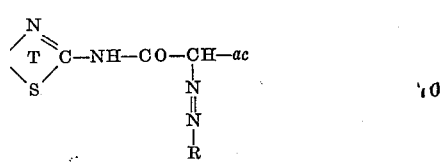

wherein T stands for the radical of a thiazole compound, *ac* stands for an acyl radical and R stands for the radical of a diazotized aminothiazole sulfonic acid compound, being in form of their alkali metal salts generally yellow to brown substances which are soluble in water and dyeing cellulosic fibres generally yellow shades of good fastness to light which are unaffected by brightening and which can be discharged to a pure white.

4. The azodyestuff of the following formula:

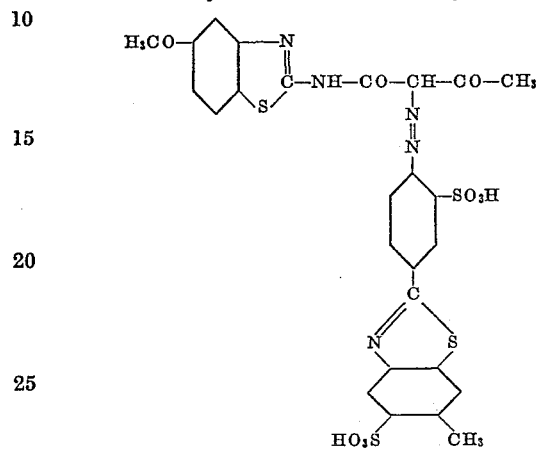

dyeing cotton greenish-yellow shades of good fastness to light which are unaffected by brightening and which can be discharged to a pure white.

5. The azodyestuff of the following formula:

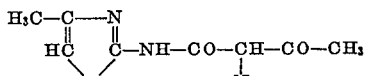

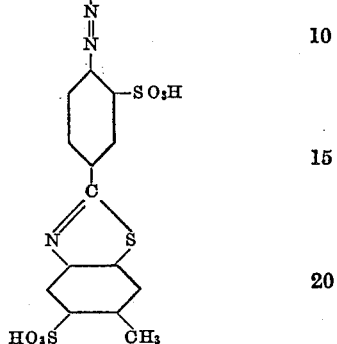

dyeing cotton greenish-yellow shades of good fastness properties which can be discharged to a pure white.

HUGO SCHWEITZER.
GERHARD SCHRADER.